United States Patent
Ding et al.

(10) Patent No.: US 9,611,159 B2
(45) Date of Patent: Apr. 4, 2017

(54) FENTON REACTOR AND METHOD FOR SEWAGE TREATMENT USING THE SAME

(71) Applicant: Nanjing University, Nanjing (CN)

(72) Inventors: Lili Ding, Nanjing (CN); Mengtian Chen, Nanjing (CN); Hongqiang Ren, Nanjing (CN)

(73) Assignee: NANJING UNIVERSITY, Nanjing (CN)

(*) Notice: Subject to any disclaimer, the term of this patent is extended or adjusted under 35 U.S.C. 154(b) by 121 days.

(21) Appl. No.: 14/716,916

(22) Filed: May 20, 2015

(65) Prior Publication Data
US 2015/0336825 A1 Nov. 26, 2015

(30) Foreign Application Priority Data
May 20, 2014 (CN) .......................... 2014 1 0212503

(51) Int. Cl.
C02F 1/44 (2006.01)
C02F 1/66 (2006.01)
C02F 1/72 (2006.01)
C02F 101/30 (2006.01)

(52) U.S. Cl.
CPC .............. *C02F 1/722* (2013.01); *C02F 1/725* (2013.01); *C02F 1/444* (2013.01); *C02F 1/66* (2013.01); *C02F 2101/30* (2013.01); *C02F 2305/026* (2013.01)

(58) Field of Classification Search
CPC .. C02F 1/444; C02F 1/66; C02F 1/722; C02F 1/725; C02F 2101/30; C02F 2305/026
See application file for complete search history.

(56) References Cited

U.S. PATENT DOCUMENTS 5,376,284 A * 12/1994 Takemura ............... C02F 1/722
210/188

FOREIGN PATENT DOCUMENTS

CN 103962160 A * 8/2014

OTHER PUBLICATIONS

SIPO of People's Republic of China, First Office Action in 201410212503.5 (2014).*

(Continued)

*Primary Examiner* — Lucas Stelling
(74) *Attorney, Agent, or Firm* — Matthias Scholl, PC; Matthias Scholl

(57) ABSTRACT

A Fenton reactor, including a body. The body includes: from the bottom up, a sewage introduction zone, a solid acid reaction zone, tubular ceramic membranes, and a water generation zone. A water feed pump, a first chemical feed pump, and a second chemical feed pump are disposed below the body. The outlets of the water feed pump, the first chemical feed pump, and the second chemical feed pump communicate with the water inlet of the body. The water feed pump, the first chemical feed pump, and the second chemical feed pump are provided with flow meters, respectively. The solid acid reaction zone is disposed above the sewage introduction zone, and the tubular ceramic membranes are disposed in the center of the solid acid reaction zone and separate the solid acid reaction zone to form a cavity. The water generation zone is disposed above the solid acid reaction zone.

10 Claims, 2 Drawing Sheets

(56) References Cited

OTHER PUBLICATIONS

SIPO of People's Republic of China, Second Office Action in 201410212503.5 (2014).*
Ke et al. machine translation of CN 103962160 A, (obtained from Google Nov. 2016).*

* cited by examiner

FENTON REACTOR AND METHOD FOR SEWAGE TREATMENT USING THE SAME

CROSS-REFERENCE TO RELATED APPLICATIONS

Pursuant to 35 U.S.C. §119 and the Paris Convention Treaty, this application claims the benefit of Chinese Patent Application No. 201410212503.5 filed May 20, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to an improved Fenton reactor and method using the same for sewage treatment.

Description of the Related Art

Typically, a Fenton reactor requires a large number of acid-base indicators to accurately maintain an acidic reaction environment, which increases the production and disposal costs. In addition, the reactor often adopts the form of a fluidized bed which is energy-consuming, and the catalyst particles tend to rub against one another in the fluidized bed causing loss of function. In addition, the catalyst is often loaded on an inorganic carrier, and so it has low catalytic activity and short service life.

SUMMARY OF THE INVENTION

In view of the above-described problems, it is one objective of the invention to provide an improved Fenton reactor and a method using the same for sewage treatment that features low energy consumption, low dosage requirement for acid-base indicators, low yield of iron-containing sludge precipitate, and high utilization rate of catalysts.

To achieve the above objective, in accordance with one embodiment of the invention, there is provided an improved Fenton reactor, comprising a body, the body comprising: from the bottom up, a sewage introduction zone, a solid acid reaction zone, tubular ceramic membranes, and a water generation zone. A water feed pump, a first chemical feed pump, and a second chemical feed pump are disposed below the body; outlets of the water feed pump, the first chemical feed pump, and the second chemical feed pump communicate with a water inlet of the body; the water feed pump, the first chemical feed pump, and the second chemical feed pump are provided with flowmeters, respectively.

The solid acid reaction zone is disposed above the sewage introduction zone, and the tubular ceramic membranes are disposed in a center of the solid acid reaction zone and separate the solid acid reaction zone to form a cavity; the water generation zone is disposed above the solid acid reaction zone; and the cavity communicates with the water generation zone.

The solid acid reaction zone is filled with a carbon-based material which is loaded with sulfonyl and ferric iron and functions as a solid acid catalyst; an upper sidewall of the body corresponding to the solid acid reaction zone is provided with a first water outlet, and a quartz sand filter is disposed around the first water outlet; the first water outlet is connected in sequence to a reflux pipe, a reflux pump, and a flowmeter; and an outlet of the reflux pipe communicates with the water inlet disposed below the body.

The quartz sand filter comprises a quartz sand filter bag, a fixed mount, a fixed plate, and a water outlet; the quartz sand filter bag is placed in the fixed mount, one end of the quartz sand filter bag is fixed on the fixed plate, and the water outlet is connected to the reflux pipe.

A sidewall of the body corresponding to the water generation zone is provided with a second water outlet, and the second water outlet is connected in sequence to a pressure meter and an effluent pump.

In a class of this embodiment, the sewage introduction zone comprises an inclined water inlet channel; the body comprises a support frame dividing the solid acid reaction zone from the sewage introduction zone, and bottoms of the tubular ceramic membranes are fixed in a middle of the support frame.

In a class of this embodiment, a gas-liquid backwashing device is disposed at a lower part of an outer sidewall of the solid acid reaction zone, the gas-liquid backwashing device comprises a flowmeter, a backwashing water tank, and an air compressor. The rinsing adopts the periodic in situ regeneration membrane technology. The pollutants on the surface of the membrane are first rinsed with air and then with water, so that the membrane flux of the tubular ceramic membranes maintains constant and does not decrease for quite a few time.

In a class of this embodiment, a gas gauge and a gas pump are connected to a top of the water generation zone; by the action of the gas pump, a negative pressure is produced in the water generation zone, and a filtrate originated from the tubular ceramic membranes and stored in the water generation zone is discharged out of the body via the effluent pump. The arrangement of the water generation zone favors the discharge of the filtrate in the tubular ceramic membrane under low energy consumption.

In a class of this embodiment, the quartz sand filter comprises quartz sand having a particle size of between 0.5 and 1 mm and a density of between 2 and 3 $g/cm^3$, and iron sand having a particle size of between 0.3 and 0.5 mm and a density of between 2 and 3 $g/cm^3$. The quartz sand blocks the carrier particles from entering the reflux pipe. The effluent returns to the water inlet of the body via the reflux pipe and is purified again in the reactor. Thereafter, part of effluent is discharged out of the body via the second water outlet.

In a class of this embodiment, the carbon-based material in the solid acid reaction zone has a density of 1 $g/cm^3$, and a particle size of between 600 and 700 mm; a modulus expanded bed is adopted for filling, with a filling rate of 40%, and an expansion rate of the catalyst during reaction is 40%.

In a class of this embodiment, the tubular ceramic membranes employ an acid resistant external pressure type tubular ceramic membrane, with a pore size of 500 nm. Under the action of the tubular ceramic membranes, the effluent is separated from the carrier particles and enters the water generation zone.

In another aspect, the invention provides a method for sewage treatment using the improved Fenton reactor, the method comprising:

1) pumping sewage by the feed pump to a bottom of the body via the flowmeter, pumping hydrogen peroxide by the first chemical feed pump to the bottom of the body via the flowmeter, the second chemical feed pump being used as a reserve pump, and mixing the sewage and hydrogen peroxide at the bottom of the body;

2) uniformly distributing a mixed solution obtained in 1) in the sewage introduction zone and introducing the mixed solution to the solid acid reaction zone for Fenton reaction, wherein, after reaction, the sewage enters the cavity formed by the tubular ceramic membranes from the solid acid reaction zone under the action of a constant filtration pressure of 0.1 megapascal, resulting iron-containing sludge precipitate and carrier particles are intercepted by the tubular ceramic membranes, effluent flows to the water generation zone; the solid acid catalyst supplies acidic environment for the Fenton reaction, the sewage is degraded by heterocatalysis of the Fenton reaction; and 3) starting a gas pump disposed on top of the water generation zone to produce a negative pressure in the water generation zone, discharging a filtrate originated from the tubular ceramic membranes and stored in the water generation zone out of the body via the effluent pump, and retuning part of the effluent to the bottom of the body via the reflux pump and the reflux pipe.

The arrangement of the tubular ceramic membrane reduces the loss of the catalyst carrier caused by the upward current. The reflux water dilutes the raw sewage, thereby improving the load capacity of the body. In addition, the flow velocity of the effluent gradually decreases in the solid acid reaction zone, thereby favoring the precipitation of iron-containing sludge, and reducing the salinity of the effluent.

In a class of this embodiment, in 2), a pH value of the solid acid catalyst is between 3.5 and 4.0; in 3), reflux amount of the reflux pump is between 1 and 4 times that of the sewage of the feed pump.

In a class of this embodiment, in 1), a dosage of the hydrogen peroxide is between 300 and 600 mg/L.

Advantages according to embodiments of the invention are summarized as follows.

1. The improved Fenton reactor employs a ferric oxide-loaded solid acid as a heterogeneous Fenton reaction catalyst, which ensures the acidic environment for the Fenton reaction. When the effluent reaches the water generation zone, the pH value thereof increases gradually, thereby satisfying the acid and alkaline requirements. The improved Fenton reactor requires no addition of an acid-base indicator, thereby saving the operation costs.

2. The improved Fenton reactor comprises a fixation reaction zone for catalysts instead of a fluidized bed, which reduces the mutual friction of the catalyst particles and prevents the digestion of the metal ions on the surface of the catalyst, thereby improving the utilization rate and prolonging the service life of the catalyst.

3. The improved Fenton reactor is equipped with an acid resistant external pressure type tubular ceramic membrane. The membrane is a microfiltration membrane with high porosity, and has a pore size of between 300 and 500 nm, so it can effectively intercept specific active components. In the invention, carrier particles, iron-containing sludge precipitate and macromolecular organics are active components. To filter and retain the active components, the acid resistant external pressure type tubular ceramic membrane is disposed in the middle of the reactor. By the action of the gas pump, a negative pressure is produced in the water generation zone, and the effluent penetrates into the water generation zone. Part of the effluent returns to the bottom of the body via the reflux pump and the reflux pipe. When the transmembrane pressure difference reaches a certain value, the gas-liquid backwashing device rinses the surface of the membrane. Through the filtering of the tubular ceramic membranes, the iron-containing sludge precipitate in the effluent is reduced, so is the loss of the catalyst.

4. In the improved Fenton reactor, a solid acid is employed to load iron oxide, thereby saving the addition of the iron salt and reducing the generation of sludge; an expanded bed is utilized, thereby facilitating the contact of the catalyst and the reaction solution, and improving the catalytic efficiency. The acid resistant external pressure type tubular ceramic membrane is employed to separate the catalyst from the effluent, so that the water quality is improved, and the water colority is decreased.

BRIEF DESCRIPTION OF THE DRAWINGS

The invention is described hereinbelow with reference to the accompanying drawings, in which.

Figure 1:
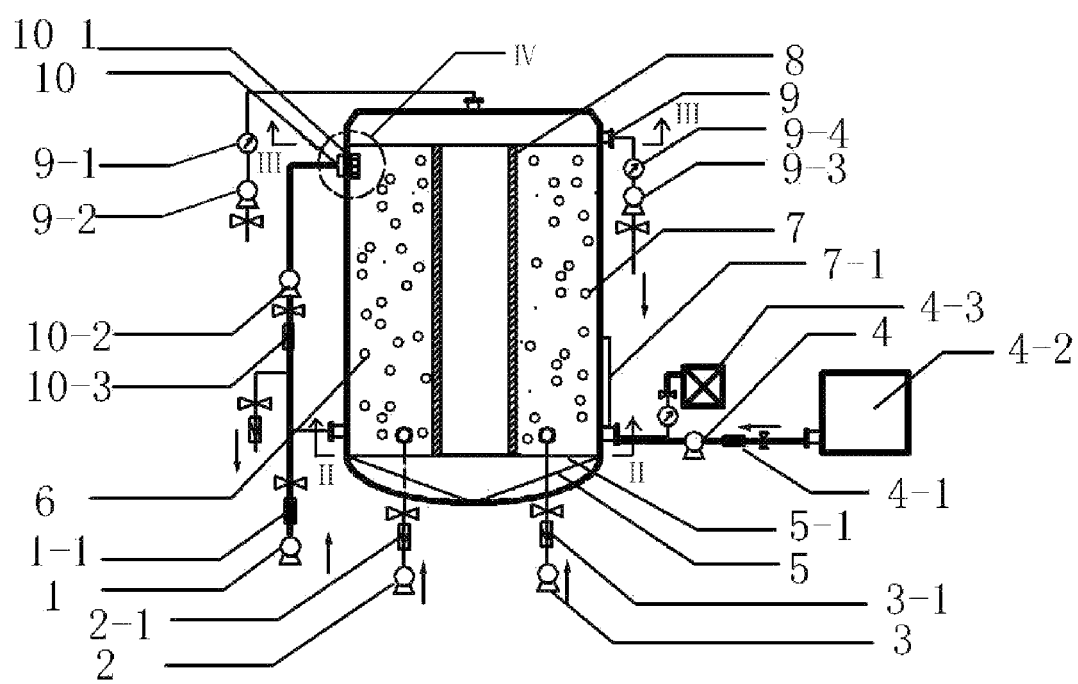
FIG. 1 is a schematic diagram of an improved Fenton reactor according to one embodiment of the invention.

In the drawings, the following reference number are used: 1: Water feed pump; 2: First chemical feed pump; 3: Second chemical feed pump; 4: Gas-liquid backwashing device; 4-1: Flowmeter; 4-2: Backwashing water tank; 4-3: Air compressor; 5: Sewage introduction zone comprising an inclined water inlet channel; 5-1: Support frame; 6: Body; 7: Solid acid reaction zone; 8: Tubular ceramic membrane; 9: Water generation zone; 9-1: Gas gauge; 9-2: Gas pump; 9-3: Effluent pump; 9-4: Pressure meter; 9-5: Second water outlet; 10: Reflux pipe; 10-1: First water outlet; 10-2: Reflux pump; 10-3: Flowmeter; 10-4: Fixed plate; 10-5: Fixed mount; 10-6: Quartz sand filter bag; 10-7: Water outlet.

DETAILED DESCRIPTION OF THE EMBODIMENTS

For further illustrating the invention, experiments detailing an improve Fenton reactor and a method for sewage treatment using the same are described below. It should be noted that the following examples are intended to describe and not to limit the invention.

Example 1

As shown in FIG. 1, an improved Fenton rector comprises a body 6. The body 6 comprises, from bottom up, a sewage introduction zone 5, a solid acid reaction zone 7 (acidic, in the form of an expanded bed), an acid resistant tubular ceramic membrane filtration zone (a closed space formed by tubular ceramic membranes 8, with a pore size of 500 nm), and a water generation zone 9 (for solid-liquid separation). A carbon-based solid acid is uniformly distributed in the solid acid reaction zone 7. The solid acid is obtained by sulfonating incompletely carbonized D-glucose. X-Ray Diffraction (XRD) shows, the carbon-based solid acid belongs to agraphitic carbon containing multiple benzene rings, with high graphitization. The intramolecular dehydration of glucoses results in the formation of chain macromolecule polymer, which is carbonized to form spherical carbon nucleus and crosslinked. Thereafter, sulfonyl and FeOOH are loaded.

The tubular ceramic membranes 8 are fixed in the middle of the solid acid reaction zone 7. The water generation zone 9 is disposed on top of the body 6 and communicates with the acid resistant tubular ceramic membrane filtration zone. The solid acid reaction zone 7 is filled with the carbon-based solid acid which is loaded with sulfonyl and ferric iron and functions as a solid acid catalyst. The catalyst has a density of 1 g/cm³, and a particle size of between 600 and 700 mm. A modulus expanded bed is adopted for filling, with a filling rate of 40%, and an expansion rate of the catalyst during reaction is 40%. The iron oxide-loaded solid acid functions as a heterogeneous Fenton reagent to degrade the sewage on the surface of the carrier through heterogeneous Fenton reaction.

The upper sidewall of the body 6 corresponding to the solid acid reaction zone 7 is provided with a first water outlet 10-1, and a quartz sand filter is disposed around the first water outlet 10-1. The quartz sand filter comprises quartz sand having a particle size of between 0.5 and 1 mm and a density of between 2 and 3 g/cm³, and iron sand having a particle size of between 0.3 and 0.5 mm and a density of between 2 and 3 g/cm³.

Figure 3:
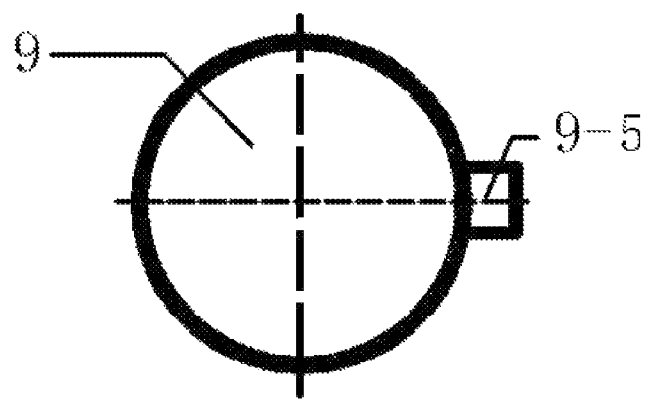
FIG. 3 is a sectional view of FIG. 1 taken from line III-III.
Figure 4:
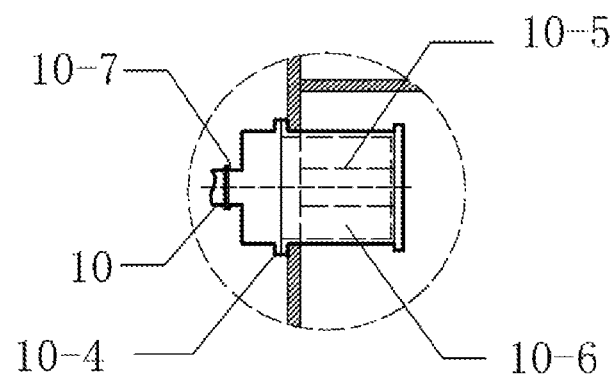
FIG. 4 is an enlarged view of part IV in FIG. 1.

The first water outlet 10-1 is connected in sequence to a reflux pipe 10 and a reflux pump 10-2; and an outlet of the reflux pipe 10 communicates with the water inlet disposed below the body 6. The quartz sand filter operates to reduce the leakage of the carrier material. The quartz sand filter comprises a quartz sand filter bag 10-6, a fixed mount 10-5, a fixed plate 10-4, and a water outlet 10-7; the quartz sand filter bag 10-6 is placed in the fixed mount 10-5, one end of the quartz sand filter bag 10-6 is fixed on the fixed plate 10-4, and the water outlet 10-7 is connected to the reflux pipe 10. The sidewall of the body corresponding to the water generation zone 9 is provided with a second water outlet 9-5 (as shown in FIG. 3), and the second water outlet 9-5 is connected in sequence to a pressure meter 9-4 and an effluent pump 9-3.

The water feed pump 1 below the body 6 regulates the feeding of the sewage, the first chemical feed pump 2 functions as the outlet of hydrogen peroxide, and the second chemical feed pump 3 functions as a reserve pump. The outlets of the water feed pump 1, the first chemical feed pump 2, and the second chemical feed pump 3 communicate with the water inlet of the body 6.

The sewage treatment of the improved Fenton reactor comprises the following processes: 1) Advanced oxidation process of heterogeneous Fenton reaction and iron coupling recycling usage; 2) Separation and filtration of the acid resistant tubular ceramic membrane.

The heterogeneous catalytic oxidation system comprises: 1) the reactants diffuse from the liquid phase to the solid phase; 2) the reactants are adsorbed on the surface of the catalyst; 3) catalytic reaction; 4) desorption of the reaction products from the surface of the catalyst; 5) the reaction products diffuse to the liquid phase. The solid acid catalyst supplies acidic environment for the Fenton reaction. FeOOH loaded on the solid acid participates in the heterogeneous Fenton reaction in the expansion state. Thereafter, the sewage is degraded.

In general, a heterogeneous Fenton reaction can be expressed briefly as follows:

Adsorption: A(oxidizer)+S(surface adsorption center)→AS; B(Pollutants)+S(surface adsorption center)→BS;

Catalytic reaction: AS+BS→PS(product on the surface)+S(surface adsorption center);

Desorption and dissociation: PS→P(liquid phase product)+S(surface adsorption center).

In the improved Fenton reactor, in the presence of the carbon-based solid acid carrier, the heterogeneous Fenton reaction is as follows:

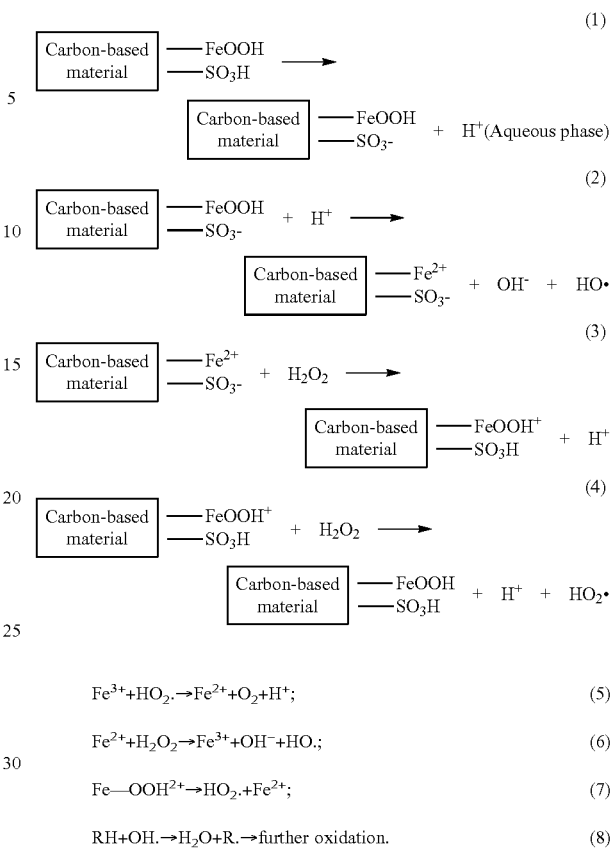

$$Fe^{3+}+HO_2 \cdot \rightarrow Fe^{2+}+O_2+H^+; \tag{5}$$

$$Fe^{2+}+H_2O_2 \rightarrow Fe^{3+}+OH^-+HO \cdot; \tag{6}$$

$$Fe-OOH^{2+} \rightarrow HO_2 \cdot + Fe^{2+}; \tag{7}$$

$$RH+OH \cdot \rightarrow H_2O+R \cdot \rightarrow \text{further oxidation}. \tag{8}$$

Compared with the prior art, the improved Fenton reactor provides an acidic environment for the Fenton reaction, saves the consumption of the acid and alkali agent, improves the catalytic efficiency, and reduces the generation of iron-containing sludge precipitate. Using the Fenton reactor of the invention, take the wastewater from flax processing as an example, the removal rate of TOC reaches about 85-87%, and the colority is reduced by 70-80 folds.

Example 2

Figure 2:
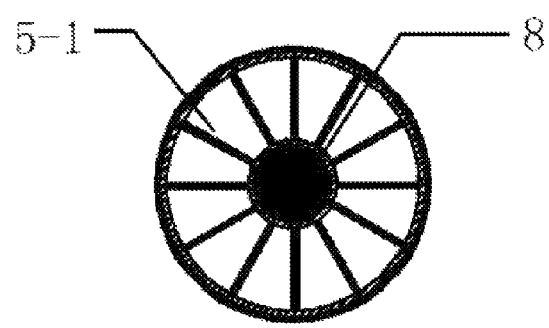
FIG. 2 is a sectional view of FIG. 1 taken from line II-II.

As shown in FIG. 2, the example is basically the same as that in Example 1 except that the sewage introduction zone 5 comprises an inclined water inlet channel, and the body comprises a support frame 5-1 dividing the solid acid reaction zone 7 from the sewage introduction zone 5, which facilitates the diffusion of the sewage from the bottom to the solid acid reaction zone 7. The water quality has almost no difference with that in Example 1, but the duration of the tubular ceramic membranes 8 is prolonged by 20%.

Example 3

The example is basically the same as that in Example 1 except that a gas gauge 9-1 and a gas pump 9-2 are connected to the top of the water generation zone 9. By the action of the gas pump 9-2, a negative pressure is produced in the water generation zone 9, and a filtrate originated from the tubular ceramic membranes 8 and stored in the water generation zone 9 is discharged out of the body 6 via the effluent pump 9-3.

As shown in FIG. 1, a gas-liquid backwashing device 4 is disposed at a lower part of an outer sidewall of the solid acid reaction zone 7. The gas-liquid backwashing device comprises a flowmeter 4-1, a backwashing water tank 4-2, and an air compressor 4-3. The rinsing adopts the periodic in situ regeneration membrane technology. The pollutants on the surface of the membrane are first rinsed with air and then with water, so that the membrane flux of the tubular ceramic membranes 8 maintains constant and does not decrease for quite a few time.

Example 4

The invention further provides a method for sewage treatment using the improved Fenton reactor, the method comprising:

1) pumping sewage by the feed pump 1 to a bottom of the body 6 via the flowmeter 1-1, pumping hydrogen peroxide by the first chemical feed pump 2 to the bottom of the body 6 via the flowmeter, the second chemical feed pump 3 being used as a reserve pump, and mixing the sewage and hydrogen peroxide at the bottom of the body 6;

2) uniformly distributing a mixed solution obtained in 1) in the sewage introduction zone 5 and introducing the mixed solution to the solid acid reaction zone 7 for Fenton reaction. The pH value in the solid acid reaction zone 7 is controlled at 3.5-4.0 thereby satisfying the acidic environment for the Fenton reaction. The iron cycle of $Fe^{2+}$—FeOOH precipitate-release of $Fe^{2+}$ in the Fenton reaction saves the iron consumption.

After reaction, the sewage enters the cavity formed by the tubular ceramic membranes 8 from the solid acid reaction zone 7 under the action of a constant filtration pressure of 0.1 megapascal, resulting iron-containing sludge precipitate and carrier particles are intercepted by the tubular ceramic membranes 8, effluent flows to the water generation zone 9; the solid acid catalyst supplies acidic environment for the Fenton reaction, the sewage is degraded by heterocatalysis of the Fenton reaction;

3) starting a gas pump 9-2 disposed on top of the water generation zone 9 to produce a negative pressure in the water generation zone 9, discharging a filtrate originated from the tubular ceramic membranes 8 and stored in the water generation zone 9 out of the body 6 via the effluent pump 9-3, and retuning part of the effluent to the bottom of the body 6 via the reflux pump 10-2 and the reflux pipe 10.

In this example, the efficiency of the solid acid material still exceeds 90% after five times' reaction.

Example 5

The example is basically the same as that in Example 4 except that the reflux amount of the reflux pump 10-2 is between 1 and 4 times that of the sewage of the feed pump, so that the raw sewage is diluted by the reflux water, thereby improving the load capacity of the body, and enhancing the utilization rate of the Fenton reagent as well as the catalyst. Take the wastewater from flax processing as an example, the removal rate of TOC reaches about 88%, and the colority is reduced by 60-65 folds.

Example 6

The dosage of hydrogen peroxide is controlled at between 300 and 600 mg/L according to the water quality of the sewage. For example, for wastewater from flax processing, the dosage is 600 mg/L; for methyl orange wastewater, the dosage is 300 mg/L. The hydrogen peroxide is first mixed with the sewage in the chemical pipe and then enters the solid acid reaction zone 7, where the hydrogen peroxide contacts the solid acid catalyst to perform a heterogeneous Fenton reaction to degrade the sewage. 100 min later, the removal rate of TOC in the wastewater from flax processing reaches about 88%, and for methyl orange wastewater, it is 95%.

Example 7

The example is basically the same as that in Example 6 except that a gas-liquid backwashing device 4 is disposed at a lower part of an outer sidewall of the solid acid reaction zone 7. The rinsing adopts the periodic in situ regeneration membrane technology. The pollutants on the surface of the membrane are first rinsed with air and then with water, so that the membrane flux of the tubular ceramic membranes 8 maintains constant and does not decrease for quite a few time. The transmembrane pressure difference of the tubular ceramic membranes 8 is monitored by the pressure meter 9-4. When the transmembrane pressure difference increases by 15%, the backwashing is started, and the backwashing frequency is 1800 s (lasting time)/30 s (air washing)/60 s (water washing).

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A reactor, comprising: a body, the body comprising:
a) a sewage introduction zone;
b) a solid acid reaction zone;
c) tubular ceramic membranes; and
d) a water generation zone;

wherein
a water feed pump, a first chemical feed pump, and a second chemical feed pump are disposed below the body; outlets of the water feed pump, the first chemical feed pump, and the second chemical feed pump communicate with at least one water inlet of the body; the water feed pump, the first chemical feed pump, and the second chemical feed pump are provided with flowmeters, respectively;

the solid acid reaction zone is disposed above the sewage introduction zone, and the tubular ceramic membranes are disposed in a center of the solid acid reaction zone and separate the solid acid reaction zone to form a cavity; the water generation zone is disposed above the solid acid reaction zone; and the cavity communicates with the water generation zone;

the solid acid reaction zone is filled with a carbon-based material which is loaded with sulfonyl and ferric iron and functions as a solid acid catalyst; an upper sidewall of the body corresponding to the solid acid reaction zone is provided with a first water outlet, and a quartz sand filter is disposed around the first water outlet; the first water outlet is connected in sequence to a reflux pipe, a reflux pump, and a flowmeter; and an outlet of the reflux pipe communicates with the water inlet disposed below the body;

the quartz sand filter comprises a quartz sand filter bag, a fixed mount, a fixed plate, and a water outlet; the quartz sand filter bag is placed in the fixed mount, one end of the quartz sand filter bag is fixed on the fixed plate, and the water outlet is connected to the reflux pipe; and a sidewall of the body corresponding to the water generation zone is provided with a second water outlet, and the second water outlet is connected in sequence to a pressure meter and an effluent pump.

2. The reactor of claim 1, wherein the sewage introduction zone comprises an inclined water inlet channel; the body comprises a support frame dividing the solid acid reaction zone from the sewage introduction zone, and bottoms of the tubular ceramic membranes are fixed in a middle of the support frame.

3. The reactor of claim 1, wherein a gas-liquid backwashing device is disposed at a lower part of an outer sidewall of the solid acid reaction zone, the gas-liquid backwashing device comprises a flowmeter, a backwashing water tank, and an air compressor.

4. The reactor of claim 2, wherein a gas gauge and a gas pump are connected to a top of the water generation zone; by the action of the gas pump, a negative pressure is produced in the water generation zone, and a filtrate originated from the tubular ceramic membranes and stored in the water generation zone is discharged out of the body via the effluent pump.

5. The reactor of claim 4, wherein the quartz sand filter comprises quartz sand having a particle size of between 0.5 and 1 mm and a density of between 2 and 3 g/cm$^3$, and iron sand having a particle size of between 0.3 and 0.5 mm and a density of between 2 and 3 g/cm$^3$.

6. The reactor of claim 3, wherein the carbon-based material in the solid acid reaction zone has a density of 1 g/cm$^3$, and a particle size of between 600 and 700 mm; a modulus expanded bed is adopted for filling, with a filling rate of 40%, and an expansion rate of the catalyst during reaction is 40%.

7. The reactor of claim 3, wherein the tubular ceramic membranes employ an acid resistant external pressure type tubular ceramic membrane, with a pore size of 500 nm.

8. A method for sewage treatment using the reactor of claim 1, the method comprising:
　1) pumping sewage by the feed pump to a bottom of the body via the flowmeter, pumping hydrogen peroxide by the first chemical feed pump to the bottom of the body via the flowmeter, the second chemical feed pump being used as a reserve pump, and mixing the sewage and hydrogen peroxide at the bottom of the body;
　2) uniformly distributing a mixed solution obtained in 1) in the sewage introduction zone and introducing the mixed solution to the solid acid reaction zone for Fenton reaction, wherein, after reaction, the sewage enters the cavity formed by the tubular ceramic membranes from the solid acid reaction zone under the action of a constant filtration pressure of 0.1 megapascal, resulting iron-containing sludge precipitate and carrier particles are intercepted by the tubular ceramic membranes, effluent flows to the water generation zone; the solid acid catalyst supplies acidic environment for the Fenton reaction, the sewage is degraded by heterocatalysis of the Fenton reaction; and
　3) starting a gas pump disposed on top of the water generation zone to produce a negative pressure in the water generation zone, discharging a filtrate originated from the tubular ceramic membranes and stored in the water generation zone out of the body via the effluent pump, and retuning part of the effluent to the bottom of the body via the reflux pump and the reflux pipe.

9. The method of claim 8, wherein in 2), a pH value of the solid acid catalyst is between 3.5 and 4.0; in 3), reflux amount of the reflux pump is between 1 and 4 times that of the sewage of the feed pump.

10. The method of claim 8, wherein in 1), a dosage of the hydrogen peroxide is between 300 and 600 mg/L.

* * * * *